United States Patent [19]
Basire

[11] Patent Number: 4,654,776
[45] Date of Patent: Mar. 31, 1987

[54] CUT-OFF AMPLIFIER
[75] Inventor: Alain Basire, Versailles, France
[73] Assignee: Commissariat a l'Energie Atomique, Paris, France
[21] Appl. No.: 731,835
[22] Filed: May 8, 1985
[30] Foreign Application Priority Data
May 9, 1984 [FR] France .................. 84 07140
[51] Int. Cl.⁴ .......................... H02M 7/217
[52] U.S. Cl. ...................... 363/127; 363/89
[58] Field of Search ............. 363/3, 63, 80, 85, 89, 363/127; 323/271, 272, 283

[56] References Cited
U.S. PATENT DOCUMENTS

| | | | |
|---|---|---|---|
| 3,390,321 | 6/1968 | Plow | 363/85 |
| 3,597,674 | 8/1971 | Abbey | 363/89 |
| 3,679,957 | 7/1972 | Beesley et al. | 363/127 |
| 4,272,807 | 6/1981 | Gallagher | 363/89 X |
| 4,447,868 | 5/1984 | Turnbull | 363/127 X |
| 4,495,557 | 1/1985 | Weit | 363/89 |

FOREIGN PATENT DOCUMENTS

| | | |
|---|---|---|
| 0057340 | 8/1982 | European Pat. Off. |
| 2213612 | 9/1973 | Fed. Rep. of Germany |
| 2117985 | 10/1983 | United Kingdom |

Primary Examiner—Patrick R. Salce
Assistant Examiner—Marc S. Hoff
Attorney, Agent, or Firm—Pearne, Gordon, McCoy & Granger

[57] ABSTRACT

A cut-off amplifier regulating the supply voltage of a load. This cut off amplifier comprises n bidirectional switches receiving input voltages which are alternatively positive and negative. These switches are connected to the load through a choke and to control means which place only one of the switches in the "on" state when the others are in the "off" state. The phase of the input voltage which is off (selected by the switches) depends on the comparison between the voltage applied to the load and a reference voltage.

7 Claims, 8 Drawing Figures

| HEXADECIMAL ADDRESS | BINARY ADDRESS | BINARY DATA | SWITCH CLOSED | PHASES | |
|---|---|---|---|---|---|
| | $I_M>I_C$ ? $V_3>V_1$ ? $V_2>V_3$ ? $V_1>V_2$ ? | ROM OUTPUTS 20 19 18 | | LOWER | UPPER |
| 0 | 0000 | 111 | 10 | — | — |
| 1 | 0001 | 110 | 11 | V1 | V2 |
| 2 | 0010 | 101 | 10 | V2 | V3 |
| 3 | 0011 | 110 | 12 | V1 | V3 |
| 4 | 0100 | 011 | 12 | V3 | V1 |
| 5 | 0101 | 011 | 11 | V3 | V2 |
| 6 | 0110 | 101 | — | V2 | V1 |
| 7 | 0111 | 111 | | — | — |
| 8 | 1000 | 111 | | — | — |
| 9 | 1001 | 101 | 11 | V1 | V2 |
| A | 1010 | 011 | 12 | V2 | V3 |
| B | 1011 | 011 | 12 | V1 | V3 |
| C | 1100 | 101 | 10 | V3 | V1 |
| D | 1101 | 110 | 11 | V3 | V2 |
| E | 1110 | 110 | 10 | V2 | V1 |
| F | 1111 | 111 | | — | — |

$I_M > I_C$ : addresses 0–7
$I_M < I_C$ : addresses 8–F

CUT-OFF AMPLIFIER

BACKGROUND OF THE INVENTION

The present invention relates to a cut-off amplifier and is applicable to the regulation of the supply voltage of a load, such as a motor, and a more particularly a motor of autosynchoronous type. For example, this motor can be of the type used in robotics. In this special field, the motors at times absorb electrical energy in order to supply mechanical energy and at times absorb mechanical energy for restoring the electrical energy to the source which supplies them.

Cut-off amplifiers are known, which in particular make it possible to supply direct current motors. These cut-off amplifiers are of two types and cut-off can take place either from two d.c. voltages, one positive and one negative, or from the a.c. mains.

Figure 1:
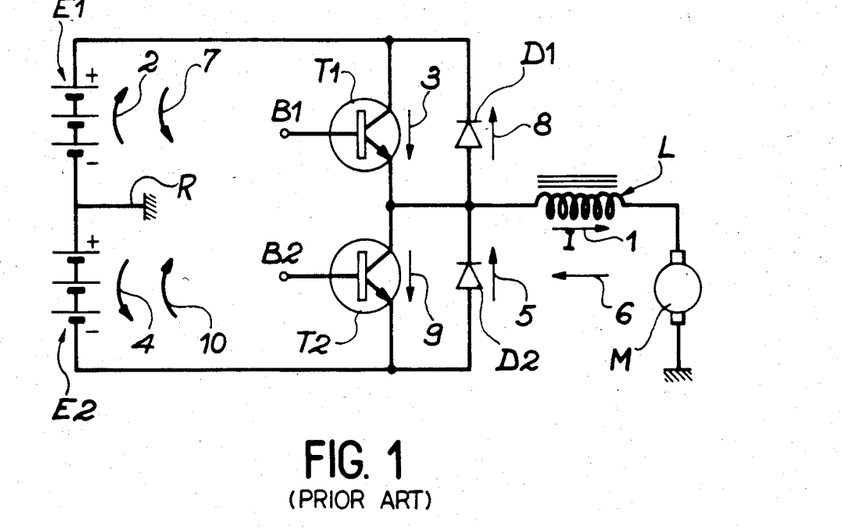
FIG. 1 illustrates diagrammatically a known cut-off amplifier operating from two d.c. supply sources.

A cut-off amplifier operating from the d.c. voltages, one positive and the other negative, is shown in FIG. 1. This cut-off amplifier comprises two d.c. power sources E1, E2, which are connected to a reference earth R. Source E1, which supplies a positive voltage with respect to earth, is connected to the load (e.g. a motor M), via a reverse-connected diode D1 and a choke L. The negative voltage E2 is connected to motor M, via a reverse-connected diode D2 and a choke L. Transistors T1, T2, e.g. of the bipolar type, are respectively connected between the positive terminal of source E1 and a terminal of choke L, and between the negative terminal of source E2 and the terminal of choke L. These switching transistors receive switching signals at their bases B1, B2. These transistors are equivalent to switches and are controlled, by not shown means, as a function of the cut-off of d.c. voltages making it possible to obtain the desired regulation.

When the motor M absorbs electrical energy and restores mechanical energy, a current I passes through choke L in the direction indicated by arrow 1. In this case and in a first phase, transistor T1 is made conductive, whilst transistor T2 is off. The currents in the different branches of the circuit are represented by arrows 2 and 3 and source E1 supplies energy. In this case and in the second phase, transistor T1 is off and transistor T2 conductive, but no current flows therein. The current is represented by arrows 4 and 5 and the source E2 absorbs energy.

Conversely, when the motor absorbs mechanical energy and restores electrical energy, the current in choke L flows in the direction indicated by arrow 6. In this case and in a first phase, transistor T2 is made conductive and transistor T1 is off. The currents in the different branches of the circuit are represented by arrows 9 and 10 and the negative voltage source E2 supplies energy. In this case and in a second phase, transistor T2 is off and transistor T1 is made conductive, but no current flows therein. The current is represented by arrows 7 and 8 and the positive voltage source E1 absorbs energy.

Thus, in both cases, one of the sources supplies energy, whilst the other receives it.

The main disadvantage of the cut-off amplifier according to FIG. 1 is that only rarely are storage batteries available, these being heavy, expensive, cumbersome, dirty and of indifferent reliability, whilst two d.c. mains, one positive and the other negative, are never available.

Figure 2:
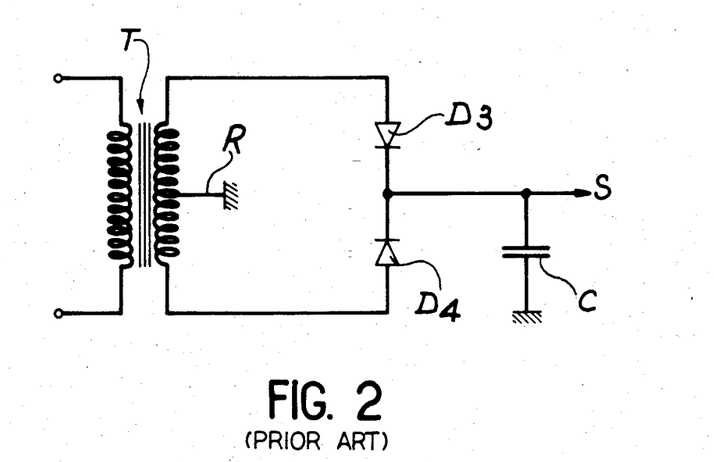
FIG. 2 illustrates diagrammatically a known cut-off amplifier operating from an a.c. mains.

A cut-off supply operating from an a.c. mains is obtained by replacing sources E1 and E2 by two connections of the type shown in FIG. 2. For example, each connection comprises an input transformer T, whose secondary has a centre connected to a reference earth R. The ends of this secondary are connected to two diodes D3, D4, making it possible to obtain at output S, a rectified voltage. A filter capacitor C connects said output to the reference earth. If output S of the cut-off supply obtained is connected, as in the preceding example, to a motor M, no problem is caused when the motor receives electrical energy and supplies mechanical energy. However, when the motor receives mechanical energy and restores the electrical energy to the mains, the voltage at the terminals of capacitor C increases rapidly. When this voltage becomes excessive, there is a destructive breakdown of the capacitor, and possibly of transistors T1, T2 and diodes, D3 and D4. It is therefore necessary to provide a system discharging the capacitors, e.g. across a resistor, when the voltage at its terminals exceeds a certain value. This generally relatively complicated system obviously requires the removal of the thermal energy by means of radiators or fans. This is a serious disadvantage, because in general, low overall dimensions of cutoff amplifiers are sought, and generally any heat removal system has large dimensions.

The present invention aims at obviating the disadvantages of cut-off amplifiers operating from the a.c. mains and more particularly aims at providing an a.c. voltage cut-off amplifier by means of which it is possible to restore energy to the mains, which is not possible in the case of cut-off amplifiers operating from d.c. voltages obtained by rectification of the mains.

SUMMARY OF THE INVENTION

The invention relates to a cut-off amplifier for regulating the supply voltage of a load comprising switching means connected on the one hand to one of two voltages, respectively positive and negative, and on the other hand to a first terminal of a choke, the load being connected between a second terminal of the choke and a reference earth of the mains, a rated comparator, whereof one input receives a voltage proportional to the current circulating in the load and whereof another input receives a reference voltage proportional to a reference current, one output of said comparator being connected to a control input of switching means in order to regulate the voltage applied to the load, wherein it comprises, as switching means, a plurality of bidirectional switches, each connected to one of the n phases of a polyphase a.c. mains, control means connected by inputs to phases of the mains and having n outputs respectively connected to n control inputs of n bidirectional switches, the control means controlling said switches, so that only one of them is closed when the others are open, in such a way that the phase whose potential is most positive compared with the potential of the reference earth is selected, when the voltage proportional to the current circulating the load, is below the reference voltage, and in order to select the phase whose potential is most negative compared with the potential of the reference earth, when the voltage applied to the load exceeds the rated voltage.

According to another feature, the control means, comprises $n(n-1)/2$ phase voltage comparators, each having two inputs and one output, the $n(n-1)/2$ outputs of said comparator respectively supplying the binary signal representing results of said comparisons, a read-only memory having addressing inputs respectively connected to the $n(n-1)/2$ outputs of the phase voltage comparators and to the output of the rated comparator, control inputs of the switching means being respectively connected to the n data outputs of the memory, each memory address containing n binary data supplied at all times, respective to the n outputs of the memory, one of said data corresponding at all times to the closing of one of the switches and the $n-1$ other data corresponding to the opening of the $n-1$ other switches, the address selected at all times in the memory by the output signals of the comparators being the address for which the phase at this time is that having the most positive voltage compared with the voltage of the reference earth, the voltage applied to the load being below the reference voltage, or the address for which the phase at this time is that whose voltage is most negative compared with the reference earth voltage, the voltage applied to the load exceeding the reference voltage.

According to another feature of the invention, each switch comprises a bridge having four diodes respectively located in the four branches connecting four nodes of said bridge, which is also defined by two diagonals, two of the bridge nodes located on one of the diagonals being respectively connected to the corresponding phase of the mains, and to the reference earth, the switch also comprising a switching transistor, whereof one switching control electrode receives the signal from the corresponding output of the memory for said phase, the two other electrodes of the transistor being respectively connected to the two other bridge nodes located on the other diagonal, the diodes being oriented in such a way that the current flowing in the transistor, when it is made conductive, by the output signal of the memory, is always in the same direction, no matter what the half-cycle of the phase applied to the bridge, the conductive state of the transistor, corresponding to the closing of said switch, the off state of the transistor corresponding to the open state of said switch.

According to another feature, the cut-off amplifier also comprises means connected to the load for comparing the value of the voltage proportional to the current in the load with the value of maximum voltage proportional to a maximum current which would circulate in the load, one output of said current comparison means being connected to another addressing input of the memory so that, when the the voltage proportional to the current in the load exceeds the maximum voltage, the memory is addressed in such a way that its outputs supply binary data, corresponding to the blocking of all the control transistors of the switches.

According to another feature, the amplifier also comprises bidirectional energy dissipation means, connected between the first terminal of the choke and the reference earth, in order to dissipate the pulsed energy resulting from the overvoltage of said first terminal, between the opening of one switch and the closing of another.

According to another feature, the binary data from the memory outputs are respectively applied to the control electrode of the transistors by coupling and impedance matching means.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 3:
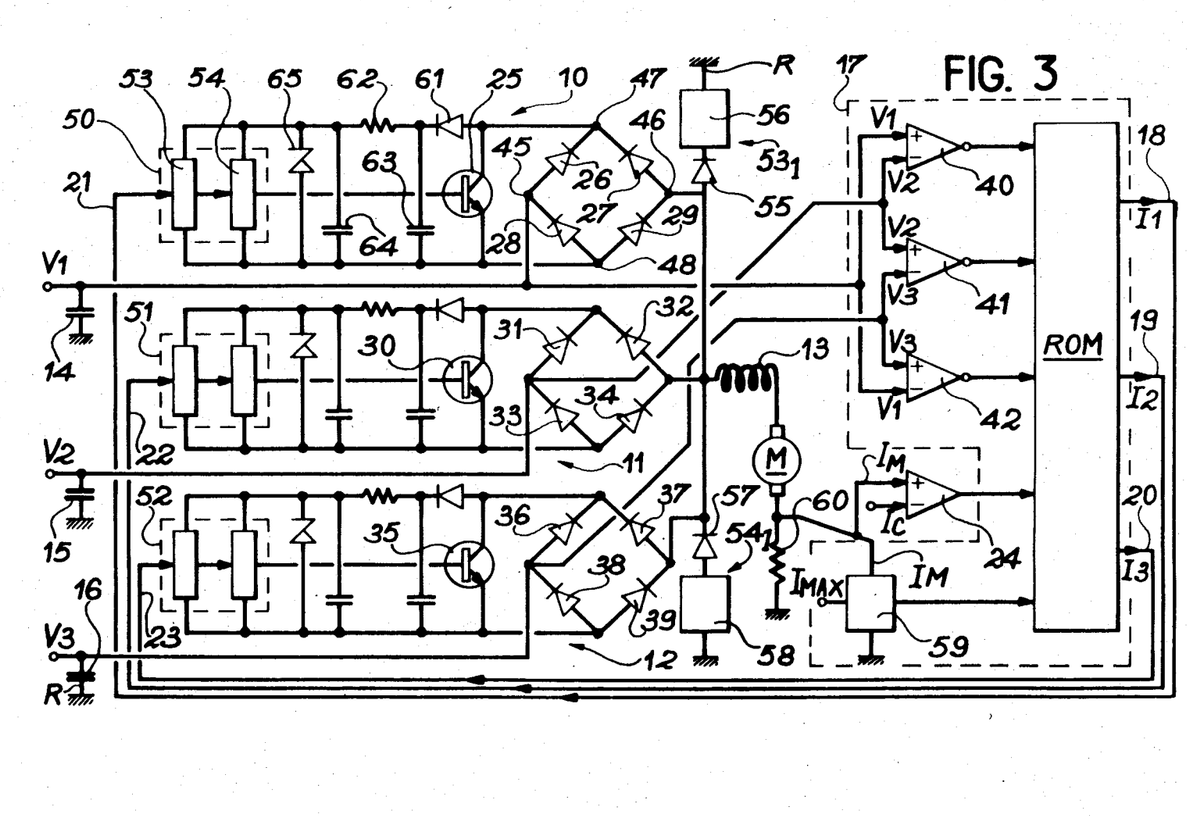
FIG. 3 illustrates diagrammatically a cut-off amplifier acording to the invention.

FIG. 3 diagrammatically shows a cut-off amplifier according to the invention. This amplifier makes it possible to regulate the supply voltage of a load, e.g. constituted by a motor M. In the embodiment shown in the drawing, it comprises switching means 10, 11, 12, connected on the one hand, respectively to three phases of a three phase a.c. mains, and on the other hand to a first terminal of choke 13. Motor M, which forms the load, is connected between a second terminal of said choke and a reference earth R of the mains. In the represented embodiment, it is assumed that the mains is of the three-phase type, but could also comprise an integral number N of phases and n switching means. The voltages of the three-phase means are respectively designated by V1, V2 and V3. Each of the phases of said mains is shunted by a capacitor. The shunt capacitors of the different phases are 14, 15, 16 and serve to compensate the choke nature of the mains, so that sudden shunt variations do not lead to sudden voltage variations.

The amplifier also comprises control means 17 connected by inputs to phases of the mains. In the case of mains with n phases, said control means have n outputs connected to n control inputs of the switching means. In the considered embodiment (three-phase mains), the control means have three outputs 18, 19, 20, respectively connected to control inputs 21, 22, 23 of switching means 10,11, 12. Finally, the amplifier also comprises the rated comparator 24, whereof one input receives the voltage $I_M$ applied to load M and whereof another input receives a rated voltage $I_C$. One output of said comparator is connected to a control input of control means 17. The latter control the switching means, so as to regulate the voltage applied to the load, as will be shown hereinafter.

Each of the switching means connected to each of the phases $V_1$, $V_2$, $V_3$ is constituted, as shown hereinafter, by a bidirectional switch. For switching means 10 connected to phase $V_1$, the bidirectional switch comprises e.g. a bipolar transistor 25, as well as a diode bridge comprising diodes 26, 27, 28, 29. In the same way the bidirectional switch of switching means 11 comprises an e.g. bipolar transistor 30, as well as diodes 31, 32, 33 and 34. Finally, the bidirectional switch of switching means 12 comprises an e.g. bipolar transistor 35, as well as a diode bridge 36, 37, 38, 39. The switching bipolar transistor as will be shown hereinafter, can e.g. be replaced by a field effect transistor or by a G.T.O. thyristor.

The control means 17 associated with comparator 24 control the aforementioned switches, in such a way that only one of them is closed when all the others are open. As will be shown in greater detail hereinafter, this makes it possible to select the phase whose potential is the most positive compared with the potential of the reference earth when the voltage $I_M$ proportional to the current circulating in the load is lower than the reference voltage $I_C$ proportional to a reference current. The control means 17 can also control the switches, so that only one of them is closed when the others are open, so as to permit the selection of the phase whose potential is the most negative compared with the potential of the reference earth, when the voltage $I_M$ exceeds the reference voltage $I_C$.

In the embodiment shown in the drawing (three-phase means), the control means 17 comprise three phase voltage comparators 40, 41, 42, which make it possible to compare the three phases of the mains in pairs. The outputs of these comparators are respectively connected to the inputs of a read only memory (ROM). Comparator 40 makes it possible to compare voltages $V_1$, $V_2$ of two phases, comparator 41 makes it possible to compare voltages $V_2$, $V_3$ of two other phases and comparator 42 makes it possible to compare voltages $V_3$ and $V_1$ of the two other phases. In general terms, for a.c. mains having n phases, the control means 17 comprise $n(n-1)/2$ phase voltage comparators, each having two inputs and one output. The $n(n-1)/2$ outputs of these comparators respectively supply binary signals representing the results of these comparisons. In the considered embodiment, (three-phase mains), comparator 40 supplies a logic level zero signal, if the voltage $V_1$ and its positive input exceeds the voltage $V_2$ and its negative input. In the opposite case, said comparator supplies a logic level 1 signal. It is assumed that these comparators are inverting comparators. In the same way, comparator 42 supplies a logic level zero signal if voltage $V_2$ exceeds voltage $V_3$ and supplies a logic level 1 signal in the opposite case. Finally, comparator 42 supplies a logic level zero signal if voltage $V_3$ exceeds voltage $V_1$ and supplies a logic level 1 signal in the opposite case. Comparator 24 acts in the same way for $V_M > V_C$ or for $V_M < V_C$. It will be shown in greater detail hereinafter how these logic level zero or 1 signals supplied by comparators 40, 41, 42 as well as comparator 24, are used for addressing the ROM of the control means 17.

The diodes such as 26, 27, 28, 29 of e.g. switching means 10 are located in the four branches of a bridge connecting four nodes 45, 46, 47, 48 of said bridge, which is also defined by two diagonals. These two diagonals are e.g., in the case of switching means 10, the diagonals 47, 48 and the diagonals 45, 46. Two of the nodes 45, 46 of the corresponding diagonal are respectively connected to the phase $V_1$ of the mains and to the reference earth R. Transistor 25 receives on its control electrode (base), via coupling and matching means 50, the switching control signal from the corresponding output 18 of the ROM. The two other electrodes of this transistor (collector and emitter) are respectively connected to two other nodes 47, 48 of the diode bridge, located on the other diagonal. The diodes are oriented in such a way that the current flowing in the transistor, when the latter is conductive by the output signal of the memory, is always in the same direction, no matter what the half-cycle of phase $V_1$ applied to the bridges. The conductive state of the transistor obviously corresponds to the closing of the switch described hereinbefore, whilst the off state of this transistor corresponds to the open state of said switch. In the same way, the base of transistor 30 receives the control signal from the output 19 of the ROM, via coupling and matching means 51, whilst transistor 35 receives the control signal from the memory output 20, via coupling and matching means 52. The coupling and matching means are not described in detail here. The coupling means can e.g. be constituted in per se known manner by an optoelectronic circuit 53 making it possible to disconnect transistor 25 and the outputs of the ROM, to prevent any overvoltage on the outputs of said memory, when the transistor switches between the phases whose voltage have high values. The matching means 54 are essentially constituted by impedance matching circuits. The coupling and matching means 51, 52 are constructed in a similar manner to means 50. The amplifier also comprises bidirectional energy dissipation means $53_1$, $54_1$, connected between the first terminal of the choke and the reference earth R. These means make it possible to dissipate the pulsed energy resulting from the overvoltage on the first terminal of the choke, between the opening of one switch and the closing of the other. For the positive pulses with respect to the reference earth, they are constituted by a diode 55 associated with an energy dissipation circuit 56. This dissipation circuit, which is not shown in detail, can in per se known manner comprise transistors, resistors and capacitors, or can simply be a Zener diode. In the same way, the energy dissipation means 54 for the negative pulses with respect to the reference earth R can be constituted by a diode 57 connected to an energy dissipation circuit 58 or a Zener diode.

The amplifier also comprises means 59 for comparing the voltage $I_M$ proportional to the current flowing in load M with a reference voltage $I_{max}$. These means have an input connected to a common point between load M and a resistor 60, which itself is connected with the reference earth. Another input of the voltage comparison means 59 receives the voltage reference $I_{max}$. This voltage reference is a voltage of a predetermined value, beyond which the amplifier will be damaged. The output of the comparator 59 connected to another addressing input of the ROM. The output of comparator 59 supplies a logic level 0 signal is the voltage $I_M$ applied to the load is below the reference voltage $I_{max}$.

The switching means such as 10 are directly supplied by the diode bridge with direct current, as a result of the diode 61 connected to resistor 62, which is itself connected to capacitors 63, 64 and to the Zener diode 65. Resistor 62 and Zener diode 65 make it possible to bring to e.g. 12 volts, the supply voltage applied to transistor 25 and to the coupling and matching means 50. The same type of supply is used for switching means 11, 12.

Figure 4:
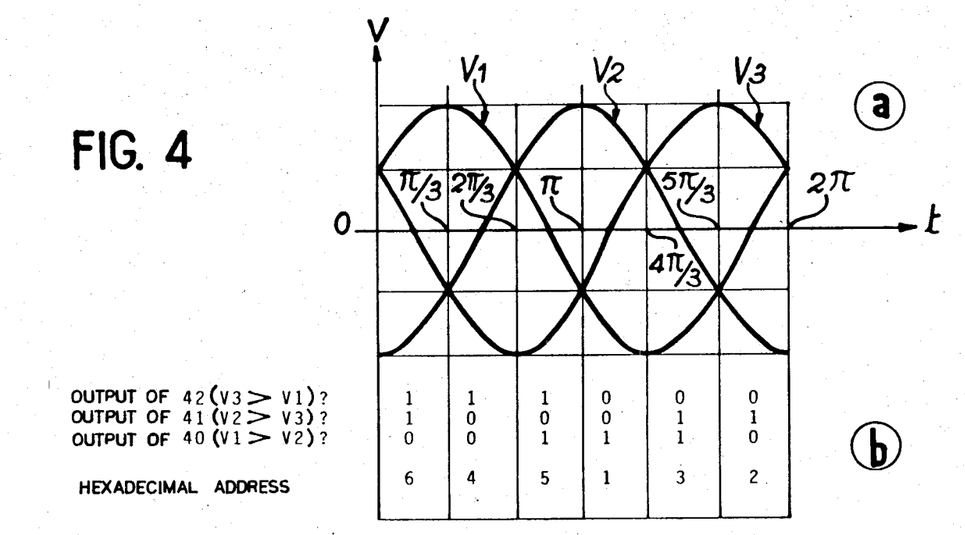
FIG. 4 illustrates at (a) a timing diagram showing the different phases of the a.c. mains supplying the amplifier according to the invention and at (b) a table providing a better understanding of the control of the switching means used in the amplifier according to the invention.

FIG. 4 provides a better understanding of the operation of the amplifier according to the invention, which is supplied by the three phases of the three-phase a.c.

mains. At (a) is shown the variations as a function of time of the voltages $V_1$, $V_2$, $V_3$ of the three phases for one cycle ($2\pi$), of these a.c. voltages.

At (b) is given a table providing the values 0 or 1 of the logic levels of the output signals of comparators 40, 41, 42. As indicated hereinbefore, the relations $V_1 > V_2$, $V_2 > V_3$, and $V_3 > V_1$ are proved when the logic level of the output signal of the corresponding amplifier is equal to 0. On considering the first line of the table, it can be seen that $V_3$ does not exceed $V_1$ between 0 and $\pi$, whilst $V_3$ exceeds $V_1$ between $\pi$ and $2\pi$. The level of the output logic signal of comparator 42 is consequently equal to 1 between 0 and $\pi/3$, $\pi/3$ and $2\pi/3$, and $\pi$. This level is equal to 0 between $\pi$ and $4\pi/3$, $4\pi/3$ and $5\pi/3$, $5\pi/3$ and $2\pi$.

The same reasoning can obviously apply to the two other lines of the table. The final line of the table expresses in hexadecimal form the addresses of the ROM, corresponding to the binary values contained in the respective columns of the table. Thus, for example, the hexadecimal address corresponding to the first column is 6. It is clear that it is possible to address the ROM by means of the output signals of comparators 40, 41, 42 but, as will be shown hereinafter, this is also possible by means of output signal of comparator 24.

Figure 5:
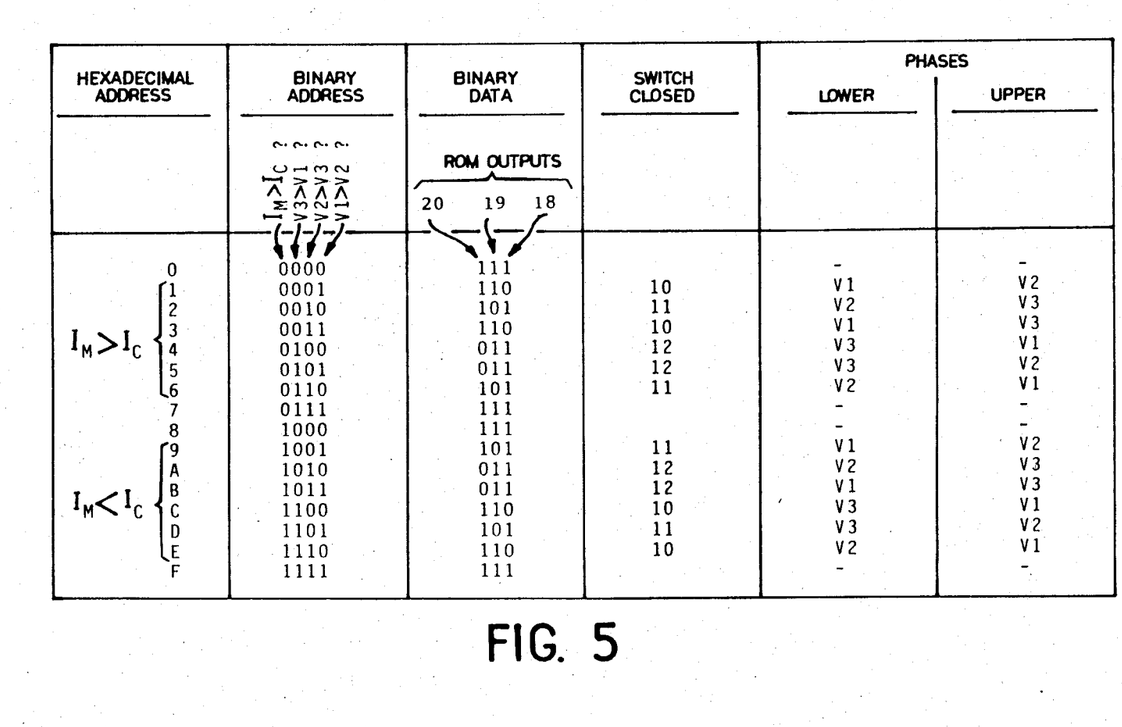
FIG. 5 illustrates a table providing a better understanding of the operation of the control means controlling the switching means used in the amplifier according to the invention.

FIG. 5 is a table providing a better understanding of how, with the aid of said ROM addressing, the switches 10, 11, 12 are controlled by the outputs 18, 19, 20 of said memory. The first column of the table gives the hexadecimal address obtained as a result of the output signals of comparators 40, 41, 42 and 24. The second column gives the binary addresses in the same way as in table B of FIG. 4, the binary values of the output signals of comparator 24 having been added in said column. The third column indicates the binary data entered in the ROM, said data being respectively supplied to the outputs 18, 19 and 20 of the ROM, in order to respectively control switching means 10, 11, 12. A logic level 0 controls the closing of the corresponding switch, whilst a logic level 1 controls its opening. Thus, for example, in said third column and for the second line thereof, output 18 controls the closing of switching 10. The two other switches receiving logic level 1 signals on their two control inputs 22, 23 are open. The fourth column of the table indicates the switches which are closed as a function of the addresses connected at the input of the ROM.

The fifth and sixth columns respectively represent the voltages applied to the load when the corresponding switch is closed. It is possible to see in these columns, the most positive or most negative phases of voltages $V_1$, $V_2$, $V_3$ with respect to the reference earth.

The hexadecimal addresses 0, 7, 8 and F are not used because they do not correspond to any real situation. When the voltage $I_M$ applies to the load exceeds the reference voltage $I_{max}$, is made of an address higher than F, for which all the switches are open. The hexadecimal addresses 1 to 6 correspond to the case where voltage $I_M$ exceeds the reference voltage $I_C$. Thus, in this case, the output signal of comparator 24 is at logic level 0. Conversely, addresses 9, A, B, C, D, E correspond to the case where the voltage $I_M$ is below the reference voltage $I_C$, In this case, the logic level of the output signal of the comparator 24 is equal to 1. These logic levels appear in the second column of the table for $I_M < I_C$.

The amplifier described hereinbefore makes it possible to achieve the aforementioned objectives. When the voltage in the load exceeds the reference voltage, the switching of the switches intervenes on the phases, whose voltages are the most negative compared with the reference voltage. However, when the voltage in the load is below the reference voltage, switching occurs on phases, whose voltages are the most positive compared with the reference voltage.

Figure 6:
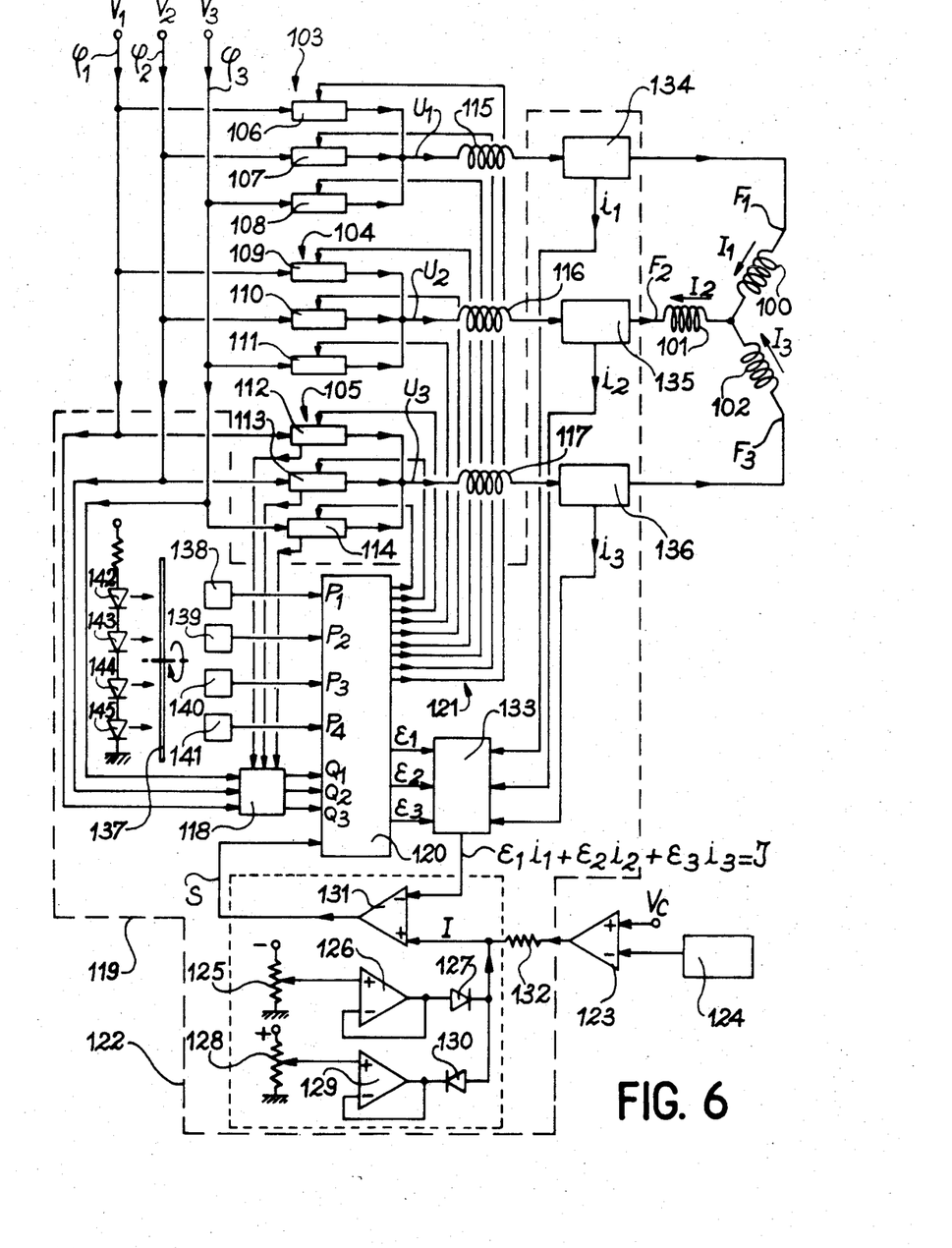
FIG. 6 shows diagrammatically the application of the amplifier of the invention the supplying of an autosynchronous motor.

The FIG. 6 diagrammatically shows the application of the cut-off amplifier of the invention to the supplying of the windings of an autosynchronous motor. Such kind of motor is described in the magazine "L'aéronautique et l'astronautique", No 82, 1980, pages 35–45. The autosynchronous motor comprises a magnetized rotor (not shown on FIG. 6) and a stator having three windings 100, 101, 102 for example. The position of the rotor is determined by a system (not shown) being of a mechanical, magnetic, electromagnetic or optical type.

According to the position of the rotor, a current circulates in the windings of the stator so as to produce a magnetic field, perpendicular to the magnetization of the rotor which is consequently submitted to a torque.

The perpendicularity between the magnetic field produced by each winding and the magnetic field produced by the rotor is generally obtained with a small precision in the state of the art. The most precise way to obtain this perpendicularity is to produce three currents out of phase by 120° in the different windings—generally, the rotor turns by steps of 30°, i.e. twelve positions by turn. This simplifies the position sensor of the rotor and the associated electronic circuits. This simplification provides satisfactory results and is equivalent to the simplification used for the collector of a classic D.C. motor. This simplification is described in the above-mentioned magazine (FIGS. 11 and 12).

On FIG. 6, $V_1$, $V_2$, $V_3$ are respectively the voltages of the three-phase of a three-phases mains.

As it will be seen hereinafter, three cut-off amplifiers according to the invention are used to supply the windings 100, 101, 102 of the autosynchronous motor. These amplifiers are shown 103, 104, 105 on the figure. Each amplifier is supplied by the three phases of the A.C. mains and is analogous to the amplifier of the FIG. 3: for each phase, the amplifier 103 comprises switching means associated with a diode bridge (analog to switching means 10 and to the diode bridge 26, 27, 28, 29 of the FIG. 3). This amplifier also comprises energy dissipation means analogous to the dissipation means $53_1$, $54_1$ of the FIG. 3. The switching means, the associated diode bridge and the dissipation means are diagrammatically shown 106, 107, 108 for the amplifier 103; 109, 110, 111 for the amplifier 104, and 112, 113, 114 for the amplifier 105. Each amplifier also comprises a choke connected to the corresponding diode bridge. These chokes (analogous to the choke 13 of FIG. 3) are shown 115, 116, 117 on FIG. 6. The three phases of the A.C. mains and the diode bridge 105, for example, are connected to comparison means 118 of control means 119. Comparison means 118 are not shown in detail on the figure. They comprise comparators analogous to the comparators 40, 41, 42 of the FIG. 3. The control means 119 comprise a Read Only Memory (ROM) 120 having outputs 121 which provide signals controlling the switching means of the cut-off amplifiers 103, 104, 105. The control means 119 also comprise means 122 to compare a voltage proportional to the current circulating into each winding, with a reference voltage proportional to a reference current, this voltage being provided on the output of the voltage comparator 123. This comparator receives on an input the output voltage of a tachymetric dynamo, proportional to the speed of the motor. This comparator receives, on another input, a voltage $V_c$ proportional to a speed reference.

The comparison means 122 comprise two current limitation means. The first limitation means comprise a potentiometer 125, an operational amplifier 126 and a diode 127; the second limitation means comprise a potentiometer 128, an operational amplifier 129 and a diode 130. The comparison means 122 also comprise a comparator 131. An input of this comparator is connected to the output of the comparator 123 through a resistor 132, and to the output of the current limitation means. Another input of the comparator 131 is connected to the outputs of a switching system 133, constituted by analogic gates of a MOS type for example. This switching system is also connected to outputs of the ROM 120 and to outputs of sensors 135, 136, 137 (for example, HALL effect type sensors). These sensors respectively provide voltages $i_1$, $i_2$, $i_3$ proportional to the currents respectively circulating into the windings of the motor. The ROM 120 provides the switching system 133 with positive or negative values depending on the angle of the rotor. The detection of the position, or the angle of the rotor, is obtained from a disc 137 solidarized with the axis of the rotor and comprising opaque and transparent slots moving before four photocouplers 138, 139, 140, 141 illuminated by the light beams of electroluminescent diodes 142, 143, 144, 145. The photocouplers, the disc and the diodes constitute a rotor position coder.

The working of the autosynchronous motor is the following: the use of three cut-off amplifiers supplied by voltages $V_1$, $V_2$, $V_3$ of the three phases of the A.C. mains produces a switching of a "LAVET" type (described in the above-mentioned magazine). This use also permits control of the speed and the torque of the motor, and the direction of the rotation of this motor. The three comparators of the comparison means 118 compare the voltages $V_1$, $V_2$, $V_3$ of the three phases, as on FIG. 3. The three sensors 134, 135, 136 provide voltages $i_1$, $i_2$, $i_3$ respectively proportional to the currents $I_1$, $I_2$, $I_3$ in the windings 100, 101, 102 of the motor. The switching means 133 (analogic type means) calculate the sum $J = \epsilon_1 \cdot i_1 + \epsilon_2 \cdot i_2 + \epsilon_3 \cdot i_3$. The analogic gates are equivalent to relays. The value of J is the value which should have a DC current if the autosynchronous motor was a D.C. motor.

In J, $\epsilon_1 = \pm 1$, $\epsilon_2 = \pm 1$, $\epsilon_3 = \pm 1$.

These values are registered in the ROM 120 and depend on the signals $P_1$, $P_2$, $P_3$, $P_4$ provided by the photocouplers 138, 139, 140, 141. The value of J is proportional to the torque of the motor.

The comparator 131 works as a trigger and compares the value of I with a reference current I provided by the comparator 123, and depending from the voltage comparison made by this comparator.

The signal S on the output of the comparator 131 has a logical level 1 if $J > I + I_o$ and has a level 0 if $J < I - I_o$. The value $I_o$ corresponds to a switching threshold of the trigger and permits the oscillation of the cut-off system. The current J linearly oscillates between the values $I + I_o$ and $I - I_o$. The system is consequently a current regulated system.

The two limitation means limit the maximum value of I to an acceptable value for amplifiers and motor components.

The ROM 120 is programmed in order that a change of value of S reverses the voltages $U_1$, $U_2$, $U_3$ applied to the chokes 115, 116, 117.

A speed regulation is obtained by the action of the comparator 123. This comparator provides a current I proportional to the difference between the speed reference voltage $V_c$ and a voltage proportional to the speed of the motor provided by the tachymetric dynamo 124.

If the speed of the motor is less than the reference speed, the value of J increases and induces an increasing of the medium value of S and the accelerating of the motor. If the motor speed is higher than the reference speed, the value of J decreases and induces a decreasing of the speed of the motor.

The ROM 120 is programmable. This ROM controls the switching means of the amplifiers 103, 104, 105 by signals provided on outputs 121 of this PROM. The programming of the ROM is based upon the consideration of the operations made by the switching means 106, 107, ..., 113, 114 which are:

a "LAVET" type switching or another type of switching on the windings of motors without collector, the cut-off of the input voltages so as to regulate the output voltage.

Figure 7:
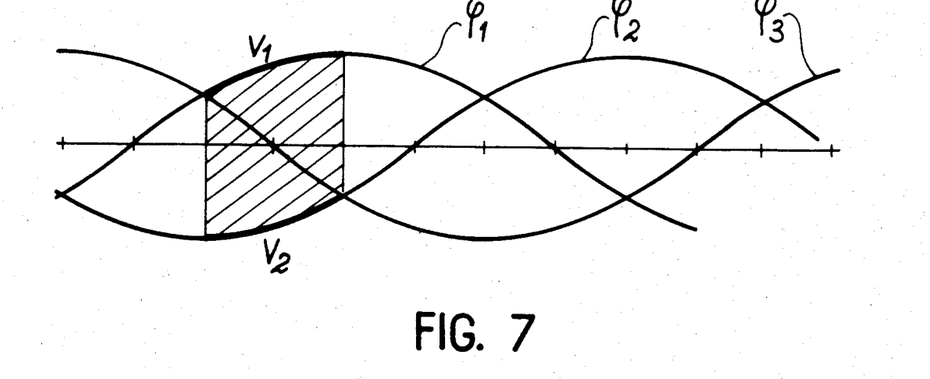
FIG. 7 is a diagram showing the switching of the phases in the supplying of an autosynchronous motor.

The following example, as illustrated on the diagram of FIG. 7, permits one to understawd more clearly the programming of the memory:

If at a given time, $V_1$ is the highest voltage and $V_2$ is the lowest voltage, it is possible to write $$V_1 > V_2 \rightarrow Q_1 = 1$$

$$V_2 < V_3 \rightarrow Q_2 = 0$$

$$V_3 < V_1 \rightarrow Q_3 = 0$$

$Q_1$, $Q_2$, $Q_3$ are the output signals of the comparison means 118. In these conditions, the phase $\phi_3$ is not used. The phase $\phi_1$ constitutes the positive supply and the phase $\phi_2$ constitutes the negative supply. The switches 108, 111, 114 remain opened (switches connected to the phase $\phi_3$).

If at this time, the "LAVET" type switching requires the voltages $F_1$, $F_2$, $F_3$, applied to the windings 100, 101, 102, such as:

$$F_1 > 0, F_2 < 0, F_3 > 0$$

these conditions depend on the values of the signals $P_1$, $P_2$, $P_3$, $P_4$ provided by the photocouplers. To comply with these conditions, it would be necessary for the switches of the switching means 106, 110, 112 to be closed. However, if this condition is satisfied, a maximum voltage applied to the windings of the motor would be obtained and run at a maximum speed. Consequently, it is necessary to control the speed of the motor.

If the three switches of the switching means 106, 110, 112 are closed, the currents circulating in the choked 115, 116, 117 linearly increase. The corresponding value of I increases. When J reaches the value $I + I_o$ (I being the reference value of the current), the signal S switches from level 1 to level 0. The programming of the memory must be as follows:

when S=1, the switches 106, 110, 112 are closed,
when S=0, the switches 107, 109, 113 are closed.
The voltages $U_1$-$U_2$, $U_2$-$U_3$, $U_3$-$U_1$ are reversed.

Figure 8:
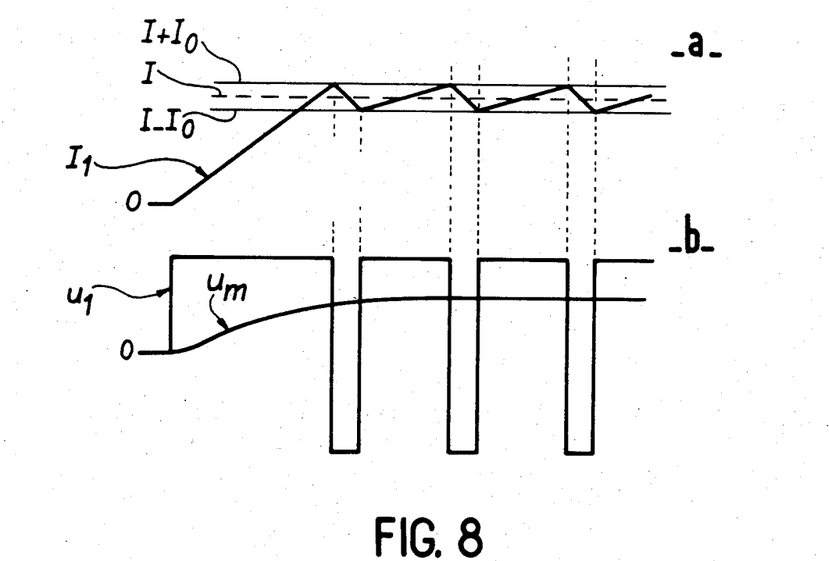
FIG. 8 shows in (a) the variation of the current in one of the windings of the motor, and shows in (b) the variation of the tension applied to this winding.

The value of the current J decreases to the value I−Io and S has again the value 1. Consequently, it is possible to obtain a cut-off of the voltages applied to the three windings. The reference value I is obtained by making the difference between the speed reference value and the real speed value provided by the tachymetric dynamo. The real speed value of the motor is proportional to the reference speed value. The variation of the current, $I_1$ (in the winding 100) for example, is shown on the diagram (a) of FIG. 8.

The voltages applied to the windings of the motor are not $U_1$, $U_2$, $U_3$ but $U_1-U_2$, $U_2-U_3$, $U_3-U_1$ and are almost constant. The cut-off of the voltage $U_1$ is shown on diagram (b) of the FIG. 8. On this diagram, $U_m$ is the medium value of the voltage.

The use of nine switches provides the possibility to control the running of a motor without collector from the three phases of an AC mains. The switches control the cut-off to modulate the value of the voltages applied to the windings of the motor so as to regulate the running of the motor.

The cut-off amplifiers act as a speed variator. When the motor provides electric energy, the system works as an ondulator or generator sending the energy to the AC mains.

What is claimed is:

1. A cut-off amplifier regulating the supply voltage of a load, comprising switching means connected to a first terminal of a choke, each switching means receiving one of two voltages, which are respectively positive and negative, of one phase of the n phases of a polyphase a.c. mains the load being connected between a second terminal of the choke and a reference earth of the mains, a rated comparator whereof one input receives a voltage proportional to a current circulating in the load and whereof another input receives a reference voltage proportional to a reference current, an output of said comparator being connected to a control input of the switching means regulating the voltage applied to the load, the switching means being n bidirectional switches, each one connected to one of the n phases of the polyphase a.c. mains, this amplifier further comprising control means connected by inputs to the phases of the mains and having n outputs respectively connected to n control inputs of the n bidirectional switches, the control means controlling said switches, in such a way that only one of them is closed when the others are open; so that the phase whose potential is most positive compared with the potential of a reference earth, is selected when the voltage applied to the load is below the reference voltage, and for selecting the phase with the most negative potential compared with the potential of the reference earth, when the voltage applied to the load exceeds the rated voltage.

2. A cut-off amplifier according to claim 1, wherein the control means comprise n((n−1)/2) phase voltage comparators, each having two inputs and one output, the n((n−1)/2) outputs of said comparators respectively supplying binary signals representing results of the comparisons, a read-only memory having addressing inputs, which are respectively connected to the n((n−1)/2) outputs of the phase voltage comparators and to the output of the rated comparator, the control inputs of the switching means being respectively connected to n data outputs of the memory, each address of the memory containing n binary data supplied at each instant respectively to the n outputs of the memory, one of said data corresponding at each instant to the closing of one of the switches and the n−1 other data corresponding to the opening of the n−1 other switches, the address selected at each instant in the read-only memory by the output signals of the comparators being the address for which the phase at this instant is that having the most positive potential compared with the potential of the reference earth, the voltage applied to the load being lower than the rated voltage, or the address for which the phase at this instant has the most negative potential compared with the potential of the reference earth, the voltage applied to the load exceeding the rated voltage.

3. A cut-off amplifier according to claim 2, wherein each switch comprises a bridge having four diodes respectively located in the four branches connecting four nodes of said bridge, which is also defined by two diagonals, two of the bridge nodes located on one of the diagonals being respectively connected to the corresponding phase of the mains, and to the reference earth, the switch also comprising a switching transistor, whereof one switching control electrode receives the signal from the corresponding output of the memory for said phase, the two other electrodes of the transistor being respectively connected to the two other bridge nodes located on the other diagonal, the diodes being oriented in such a way that the current flowing in the transistor when it is made conductive, by the output signal of the memory, is always in the same direction, no matter what the half-cycle of the phase applied to the bridge, the conductive state of the transistor, corresponding to the on state of said switch and the off state of the transistor corresponding to the off state of said switch.

4. A cut-off amplifier according to claim 3, wherein it also comprises means connected to the load comparing the value of the voltage proportional to the current in the load with the value of a maximum voltage proportional to an maximum current which could circulate in the load, one output of said voltage comparison means being connected to another addressing input of the read only memory, so that when the voltage applied to the load exceeds the maximum voltage, the memory is addressed in such a way that its outputs supply binary data corresponding to the blocking of all the control transistors of the switches.

5. A cut-off amplifier according to claim 4, wherein it also comprises bidirectional energy dissipation means, connected between the first terminal of the choke and the reference earth, in order to dissipate the pulsed energy resulting from the overvoltage on said first terminal, between the opening of one switch and the closing of another.

6. A cut-off amplifier according to claim 5, wherein the binary data of the memory outputs are respectively applied to the control electrodes of the transistors by coupling and impedance matching means.

7. A cut-off amplifier according to any one of the claims 1 to 6, wherein the load is constituted by each winding of the windings of an autosynchronous motor.

* * * * *

UNITED STATES PATENT AND TRADEMARK OFFICE
CERTIFICATE OF CORRECTION

PATENT NO. : 4,654,776

DATED : March 31, 1987

INVENTOR(S) : Alain Basire

It is certified that error appears in the above-identified patent and that said Letters Patent is hereby corrected as shown below:

Column 2, line 59, after "circulating", insert --in--.

Column 8, line 37, change "three-phases" to --three-phase--.

Signed and Sealed this

Tenth Day of November, 1987

Attest:

DONALD J. QUIGG

Attesting Officer

Commissioner of Patents and Trademarks